United States Patent [19]
Gold

[11] Patent Number: 4,778,198
[45] Date of Patent: Oct. 18, 1988

[54] APPARATUS FOR COMPENSATING TRANSVERSE FORCES IN AUTOMOTIVE STRUTS

[75] Inventor: Henning Gold, Bingen, Fed. Rep. of Germany

[73] Assignee: Audi AG, Ingolstadt, Fed. Rep. of Germany; a part interest

[21] Appl. No.: 890,397

[22] Filed: Jul. 28, 1986

[30] Foreign Application Priority Data

Jul. 26, 1985 [DE] Fed. Rep. of Germany ....... 3526815

[51] Int. Cl.[4] ............................................. B60G 11/28
[52] U.S. Cl. .................................... 280/702; 280/711; 267/64.24
[58] Field of Search ............... 280/668, 672, 693, 698, 280/702, 711; 267/64.21, 64.24, 64.19, 64.23, 64.27; 188/322.12, 298, 322.11

[56] References Cited

U.S. PATENT DOCUMENTS 2,973,968 3/1961 Behles ............................ 267/64.24

FOREIGN PATENT DOCUMENTS

| 1124833 | 3/1962 | Fed. Rep. of Germany ...... 280/702 |
| 1430597 | 4/1969 | Fed. Rep. of Germany ... 280/124 F |
| 2063448 | 7/1972 | Fed. Rep. of Germany . |
| 56615 | 4/1985 | Japan ............................... 267/64.27 |
| 832665 | 4/1960 | United Kingdom ................ 280/702 |

*Primary Examiner*—John J. Love
*Assistant Examiner*—Karin L. Ferriter
*Attorney, Agent, or Firm*—Karl Hormann

[57] ABSTRACT

An automotive wheel suspension in which forces acting transversally of a strut comprising, in telescoping relationship, a shock absorber and an elongated spring element, as a result of substantially vertical movement of the wheel are compensated by positioning the spring element substantially eccentrically relative to the axis of the shock absorber so that it substantially conforms to the direction of the resultant or sum of the forces causing vertical movement of the wheel.

21 Claims, 4 Drawing Sheets

APPARATUS FOR COMPENSATING TRANSVERSE FORCES IN AUTOMOTIVE STRUTS

BACKGROUND OF THE INVENTION

1. Field of the Invention

The invention relates to automotive wheel suspensions in general and, more particularly, to wheel suspensions adapted to compensate for, or balance, transverse forces generated as a function of the wheel being raised or lowered when subjected to varying loads. While generally applicable to allautomotive wheel suspensions, the invention will hereinafter be described in connection with independent wheel suspensions by way of preferred embodiments.

2. Description of the Prior Art

In certain independent wheel suspensions the wheel when rolling over an uneven surface or when subjected to varying loads may be raised and lowered along an arcuate path substantially coinciding with the periphery of a circle the radius of which is defined by a wheel control arm one end of which may be pivotally connected to the frame of the vehicle and the other end of which may be connected to the hub of the wheel. Lowering and raising of the wheel may be balanced or dampened by a suspension strut combining, as a telescoping unit, a shock absorber and a spring. The spring may in fact be a pneumatic spring formed by a substantially tubular rolling bellows or lobe pressurized in a manner well known in the art. As will be appreciated by those skilled in the art the movement of the wheel, hereafter referred to as "vertical movement" subjects the strut, and more particularly the shock absorbing portion thereof, to considerable transverse forces which may lead to rapid deterioration of the apparatus.

Attempts have, of course, been made to reduce such transverse forces and their adverse effect on the apparatus, but they have not, by and large, met with the desired success. One known structure of this kind is disclosed in west German patent specification DE-OS No. 20 63 448. In the arrangement disclosed in that specification a spring force compensating force acting transversally on a pneumatic spring is generally by positioning the substantially cylindrical rolling bellows of the spring obliquely, i.e. at a predetermined angle, relative to the longitudinal or center axis of the strut. The oblique positioning of the spring element is accomplished by inclining an upper seat or support surface to which the spring element is attached. The seat or support plate and the piston rod of the shock absorber are mounted to the frame of a vehicle by way of a common rotary bearing. An elastic rubber support may be placed between the rotary bearing and the frame in order to insulate driving noise otherwise penetrating from the drive arrangement to the frame.

Such a construction makes possible only partial compensation or balancing of the transverse forces which affect the piston rod bearing and the piston of the shock absorber in a particularly detrimental manner. Furthermore, the relatively strong angular inclination of the spring element or rolling lobe leads to other structural, spatial, and functional disadvantages, as will be appreciated by those skilled in the art.

It is, therefore, an object of the present invention to provide a novel wheel suspension which is free of the disadvantages of prior art devices.

Another object resides in the provision of a wheel suspension which substantially eliminates or balances transverse forces acting on the suspension strut of a wheel suspension.

A further object of the invention is to provide a wheel suspension in which transverse forces otherwise affecting the strut are substantially eliminated without requiring additional parts for the assembly.

It is also an object to provide a wheel suspension which by the simple expedient of aligning the forces of the spring with the resultant of the forces generated as a result of vertical movement of the wheel compensates or balances the transverse forces to reduce excessive wear of the shock absorber.

A further object of the invention is to eliminate, or at least substantially reduce, forces acting transversally of a strut in a wheel suspension of the kind referred to with simple means and in an economical manner.

Yet another object is the provision of a wheel suspension including a suspension strut of the kind comprising, in telescoping alignment, a shock absorber and a pneumatic spring element, in which the resultant of the forces generated as a result of vertical movement of the wheel under varying loads is drawn upon to determine the disposition of the spring element relative to the shock absorber for balancing or compensating the transverse forces.

SUMMARY OF THE INVENTION

In the accomplishment of these and other objects the invention, in a preferred embodiment thereof, provides a wheel suspension comprising a wheel rotatably mounted on a hub, means connecting the hub to a support frame for movement in substantially vertical directions, and suspension strut means for controlling the vertical movement of the hub and comprising a telescoping shock absorber extending along a predetermined axis and having a first section connected to the hub and another section connected to the support frame at a first location and an elongated spring means having a first end connected to the shock absorber and a second end connected to the support frame at a location laterally displaced from the first location. Preferably, the spring is positioned in such a manner that its forces or line of action extend in substantial conformity to the direction of the resultant or sum of forces generated by vertical movement of the wheel, thus to balance or compensate forces acting transversally of the shock absorber. The resultant extends from the frame from a location thereof removed from the seat of the shock absorber on the frame. The spring means preferably comprises a pneumatic spring, for instance, a rolling bellows, one end of which is connected to the shock absorber and an opposite end of which is connected to the frame. In another advantageous embodiment the rolling bellows is connected to a seat which is rigidly connected to the frame whereas the shock absorber is elastically connected to the frame, either directly or indirectly. Furthermore, the seat of the rolling bellows may be provided with a lateral apron engaging a peripheral portion of the bellows to prevent its lateral expansion in the direction of the transverse forces.

The apron may advantageously engage the bellows in the area of the connection between the first and second sections of the shock absorber along a peripheral arc of between 90° and 180°. The first and second sections of the shock absorber may be a cylinder and a piston rod, the latter being provided with a piston reciprocally movable within the cylinder and being guided by a bushing in a necked-down section of the cylinder.

Preferably the apron is provided with a tubular section which embraces and supports the rolling bellows in an area away from the connection between the first and second sections of the sock absorber, i.e. the necked-down portion of the cylinder.

In another advantageous embodiment the longitudinal axis of the rolling bellows may extend along or parallel to the resultant, and the bellows may then be connected with its seat on the frame eccentrically relative to the shock absorber.

The excentricity of these connections is preferably such that the sum of frictional forces acting on the guide bushing of the piston rod and on the piston of the shock absorber is as low as possible.

Preferably, the apron is profiled in such a manner that it counteracts radial expansions of the rolling bellows to varying degrees as a function of the axial compression of the bellows.

In another preferred embodiment the rolling bellows, at one of its ends, may be connected to the necked-down portion of the cylinder, and the necked-down portion may be of substantially frusto-conical configuration.

In a further preferred embodiment the suspension may be for use in connection with steered wheels, in which case the seat for the shock absorber and the rolling bellows may be supported on the frame by a rotary bearing and the resultant preferably originates within the effective diameter of the bearing.

The seat and the apron may preferably be integrally formed in the support frame of the vehicle.

In a preferred embodiment in which the seat of the rolling bellows at the support frame is positioned eccentrically and/or inclined relative to the seat of the piston rod of the shock absorber the seat may be affixed to the piston rod and in the area of the origin of the resultant it may additionally be supported on the frame.

The support between the seat of the rolling bellows and the frame may advantageously be resilient.

In yet another preferred embodiment the resilient support may be seated against a rotatably mounted plate connected to the frame by way of a rotary bearing, and the piston rod of the shock absorber may be mounted for rotation relative to the frame.

Preferably a bushing may be povided between the seat and the piston rod.

Other objects of the invention will in part be obvious and will in part appear hereinafter, and will be fully set forth in the following detailed description together with the accompanying drawings, in which FIG. 1 depicts an automotive wheel suspension in accordance with the invention, including a suspension strut and a device for compensating transverse forces;

DETAILED DESCRIPTION OF THE PREFERRED EMBODIMENTS

Figure 1:
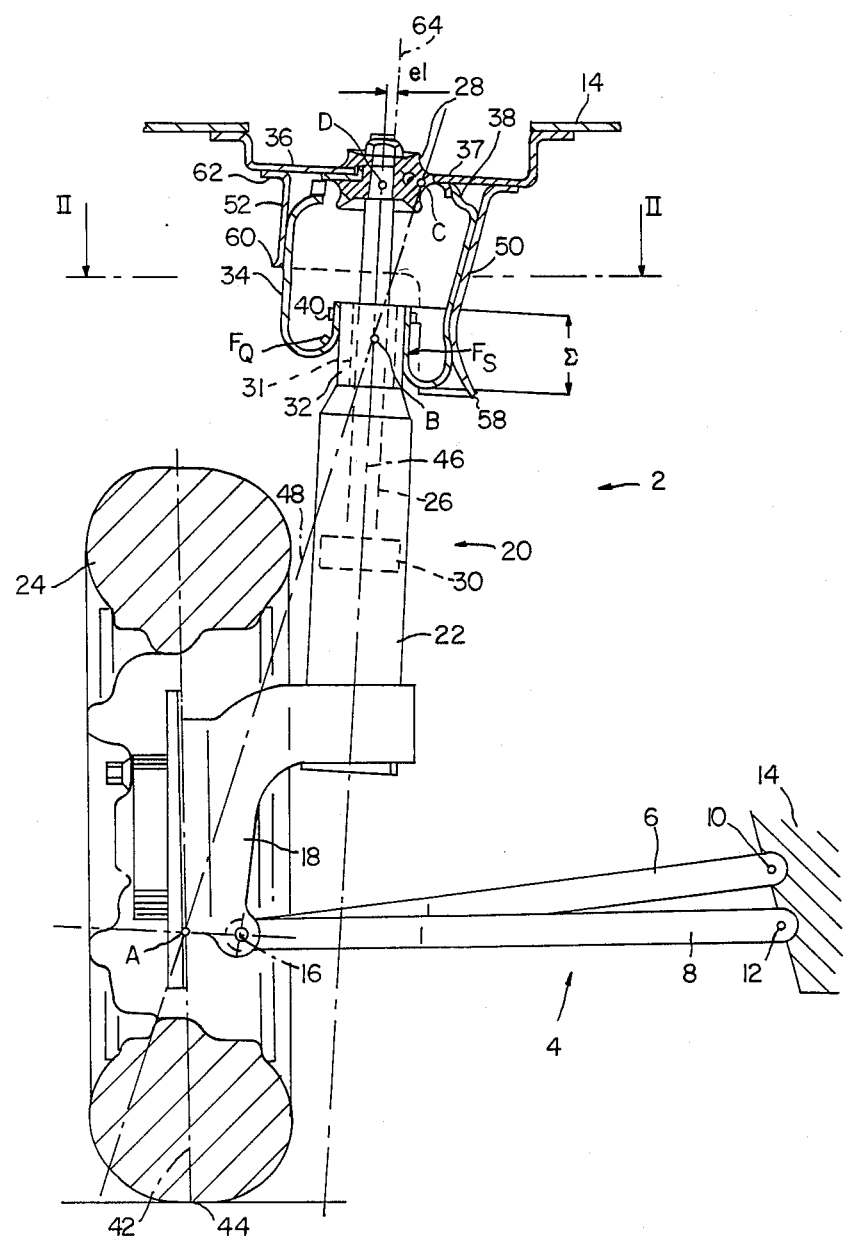

FIG. 1 depicts a suspension for non-steerable wheels of an automotive vehicle. The suspension is shown to comprise a suspension strut 2 and a lower control arm 4.

The control arm 4 comprises two links 6 and 8 which are respectively connected to a frame 14 of a vehicle (not shown) by way of pivot bearings 10 and 12. The opposite end of the control arm 4 is connected to the hub 18 of a wheel 24 by way of a bearing 16. The hub 18 forms an integral component with a telescoping shock absorber 20, the cylinder 22 of the shock absorber 20 being connected to a cantilever arm of the hub 18 in an appropriate conventional manner, as by welding or the like. The wheel 24 is rotatably mounted on the hub 18 in a conventional manner, as by bolts (not shown).

As shown in FIG. 1, the shock absorber 20 is provided with a piston rod 26, one end of which is connected to the frame 14 by way of an elastic block or seat 28 made, for instance of rubber, at a location above the wheel 24. The piston rod 26 is slidably mounted within the cylinder 22 and is guided therein by a piston 30 and by a bushing 31 seated in a necked-down end portion 32 of the cylinder 22.

An elastic and substantially cylindrical rolling bellows or lobe 34 is centrically arranged about the piston rod 26. The rolling bellows 34 constitutes a supportive spring element of a kind well known in the art. One end of the rolling bellow 34 is affixed to the frame 14 by way of a seat 36 mounted thereon. The seat 36 is provided with an axially extending flange 37 to which the bellows 34 is attached with a clamp 38. The opposite end of the bellows 34 is folded under and attached to the necked-down portion 32 of the cylinder 22 by means of a further clamp 40. Thus, during axial expansion and contraction the bellows 34 may roll along the necked-down portion 32. Such expansion and contraction may be accomplished by pressurizing and venting the bellows 34 in a manner well known by controls also well known and therefor not here shown.

Since the center plane 42 of the wheel 24 or the point 44 at which the wheel touches a rolling surface is laterally offset from the logitudinal 46 of the shock absorber 20, a load on the wheel 24 generates a force line or resultant 48 which intersects points A, B, and C. Point A is defined by the intersection of the center plane 42 of the wheel 24 and an imaginary line extending from the control arm 4. Point B defines the location at which the force of the rolling bellows 34 acts upon upon the strut 2 counteracting any load bearing upon the wheel 24. Point C is positioned along the line intersecting points A and b, and it is at point C where the force of the rolling bellows 34 is transmitted or diverted to the frame 14. It is important to note that point C is laterally displaced from a further point, D, which is of importance in connection with the geometry of the axis of the wheel suspension. This not being part of the instant invention, however, it requires no further elaboration in the present context.

Owing to the load acting asymmetrically on the wheel a transverse force $F_Q$ is generated in the area of the bushing 31 of the piston rod 26, i.e. at the necked-down portion 32 of the cylinder 22, and this transverse force would normally lead to excessive wear and jamming of the shock absorber 20. Since the load upon the wheel 24 changes as a function of dynamic conditions and of the weight of the vehicle, force $F_Q$ also changes.

For compensating these variable transverse forces there is attached to the seat 36, in the area of the upper mounting block 28 of the shock absorber 20 on the frame 14, a rigid apron 50 of substantially arcuate cross section and comprising a tubular section 52. The apron 50 is arranged or positioned in such a manner that it engages an arcuate portion of the rolling bellows 34 in a manner impeding the radial expansion thereof. The apron 50 is positioned (see FIG. 2) in a location substantially diametrically opposing the transverse forces $F_Q$ exerted upon the piston guide, i.e. substantially in the area of the piston rod bushing 31, and by reacting with the rolling bellows 34 the apron 50 contributes to generating an opposing transverse force $F_S$, thus relieving the piston guide 31 or the shock absorber 20 from unilateral transverse forces generated as a result of vertical movement of the wheel 24.

As shown in FIG. 1, the apron 50, by laterally pressing against or indenting the rolling bellows 34, in effect results in a larger support surface $I_1$ for the bellows 34 than is provided on the opposite side thereof where the force $F_Q$ is impinging. Thus, by pressing the rolling bellows 34 against the apron 50 pneumatic pressure within the bellows 34 accounts directly for the transverse force $F_S$ acting on the guide 31 of the piston rod 26. For this reason the apron 50 is sufficiently long to extend axially beyond the necked-down portion 32 of the shock absorber 20 even when the latter is fully expanded, i.e. when the wheel 24 has been lowered to its maximum extent. The apron 50 may be mounted on the frame 14 in any convnetional manner, as by welding, bolts, rivets, etc., or it may be formed as an integral part of the frame 14.

Figure 2:
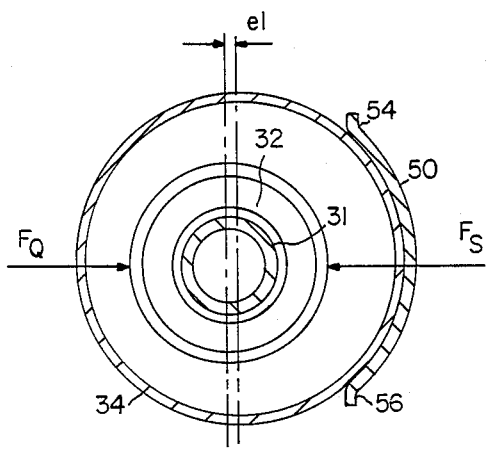
FIG. 2 is a sectional view, on an enlarged scale, along line II—II of FIG. 1.

As shown in FIG. 2, the apron 50 embraces the rolling bellows 34 by about 90°; but it may extend up to 180°, or it may be less than 90°. Marginal portions 54,56,58 of the apron 50, and marginal portion 60 of the tubular section 52 are flared in a direction away from the rolling bellows 34 in order effectively to prevent it from being damaged during its deformations as a result of vertical movements of the wheel 24. The radius of curvature of the apron 50 may be selected to be sufficiently large over all to provide for maximum engagement by the rolling bellows 34 in a center section of the apron 50, with a gradual decrease in engagement approaching zero towards the margins 54 and 56.

The tubular section 52 is affixed to the seat 36 or to the frame 14 by means of an annular flange 62 surrounding the seat 28 of the shock absorber 20. For attaching the bellows 34 to the frame 14, the flange 37 is arranged eccentrically relative to the seat 28 (point D) of the piston rod 26 in the frame 14, by a distance $e_1$, whereby the center axis 64 of the annular flange 37 or seat of the rolling bellows 34 is displaced in the direction of the transverse force $F_Q$, towards the apron 50. This eccentric displacement increases the effect of the counteracting transverse force $F_S$ generated by the apron 50.

The apron 50 is asymmetric relative to a straight line extension of the tubular section 52, but it is shaped, or has a profile, causing varying degrees of deflection or indentation of the bellows 34 as a function of its axial expansion or compaction, relative to the center axis 46 of the shock absorber 20. The effect of this is that with increased upward movement of the wheel 24 and the resulting increase in transverse force $F_Q$ the support base $1_1$ surface $1_1$ for the necked-down portion 32 becomes disproportionately enlarged relative to the opposite side, i.e. where $F_Q$ forces are acting, because of the increased indenting of the rolling bellows 34. This, of course, results in an increase in the compensating force $F_S$. The profile of the apron 50 may be shaped in accordance with the geometry of the wheel suspension as well as in proportion to applicable wheel loads, and it should in any event insure that the bushing 31 of the shock absorber 20 is substantially relieved of transverse forces in the area where the spring forces are effective.

Figure 3:
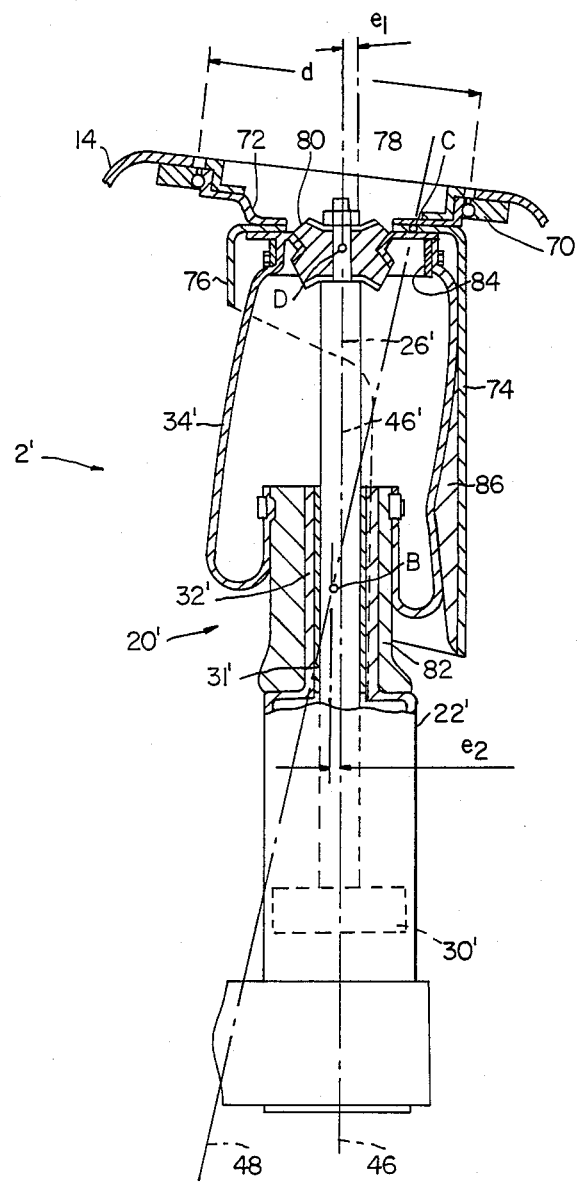
FIG. 3 depicts an automative wheel suspension for steerable wheels provided with means for compensating transverse forces in accordance with the invention, the wheel and the control arm shown in FIG. 1 having been omitted for clarity.

FIG. 3 depicts a wheel suspension for steerable wheels. For the sake of clarity, the wheel as well as the hub and control arm have been omitted as they would be substantially the same as those shown in FIG. 1. Similar parts have been given similar reference numbers, but primed.

In order to provide for steerability of the wheel (not shown), the strut 2' is mounted on the frame 14' by way of a rotary bearing 70. The bearing 70 is affixed to an asymmetric seat 72. An apron 74 with a tubular section 76 and an annular flange 78 are also affixed to the seat 72. The annular flange 78 supports an elastic seat 80 made of rubber or the like, in which the piston rod 26' of the shock absorber 20' is elastically retained. The elastic seat 80 may be connected to tha annular flange 78 by vulcanizing as is well known in the art. The outer ring or race of the bearing 70 may be affixed to the frame 14' by bolts (not shown).

The rolling bellows 34' is also attached to the annular flange 78. Thus, the rolling bellows 34', the tubular section 76, and the seat 72 are rigidly but rotatably mounted on the frame 14'.

The opposite lower end of the rolling bellows 34' is mounted on a rolling sleeve 82 which is seated on the necked-down portion 32' of the cylinder 22'. As in the arrangement of FIG. 1, the rolling bellows 34' is affixed to the annular flange 78 and the sleeve 82 by clamps.

The annular flange 78 is asymmetrically placed so that its outer annular collar 84 is eccentrically displaced from the center axis 46' of the seat 80 of the piston rod 26', by a distance $e_1$. Similarly, the outer peripheral surface of the sleeve 82 is eccentrically displaced relative to the piston rod 26', by a distance $e_2$. The eccentric displacements are on opposite sides of the axis 46'. They, $e_1$ and $e_2$ cause an increase in the counter-acting transverse force $F_S$ generated by the apron 74.

The extent of eccentric displacement $e_1$ and $e_2$ as well as the bias exerted by, and the configuration of, the apron 74 may be established empirically. For this purpose, transverse forces may be measured at point B in a test jig (not shown) having no piston rod and utilizing simulated wheel loads, and the friction contributable to the guide bushing 31' of the piston rod 26' and to the piston 30' may be derived by calculation. By appropriately adjusting the eccentric displacements $e_1$ and $e_2$, and by radially moving the apron 74, values may be set which may be expected to yield the lowest possible frictional forces.

As shown in FIG. 3, the apron 74 is provided with a padding 86 made of plastic or the like which insures a predetermined indenting of the rolling bellows 34' during vertical movement of the wheel (not shown), as well as a predetermined change in the compensating force $F_{S'}$. In addition, the rolling sleeve 82 may be substantially conical in longitudinal section so that it and the padding 86 provide for the indenting of the rolling bellows 34' necessary to generate the compensating force $F_{S'}$ and to insure a progressive spring rate, especially during very pronounced vertical movements of the wheel, by varying the effective diameter of the rolling surface of the sleeve 82. The effective diameter d of the rotary bearing 70 is sufficiently large to position point C inside of the rotational circle of the bearing 70. In this manner, transverse torques are avoided or substantially reduced, and the transverse forces $F_S$, emanating from the rolling bellows 34' are transmitted to the frame 14' without any free play.

Figure 4:
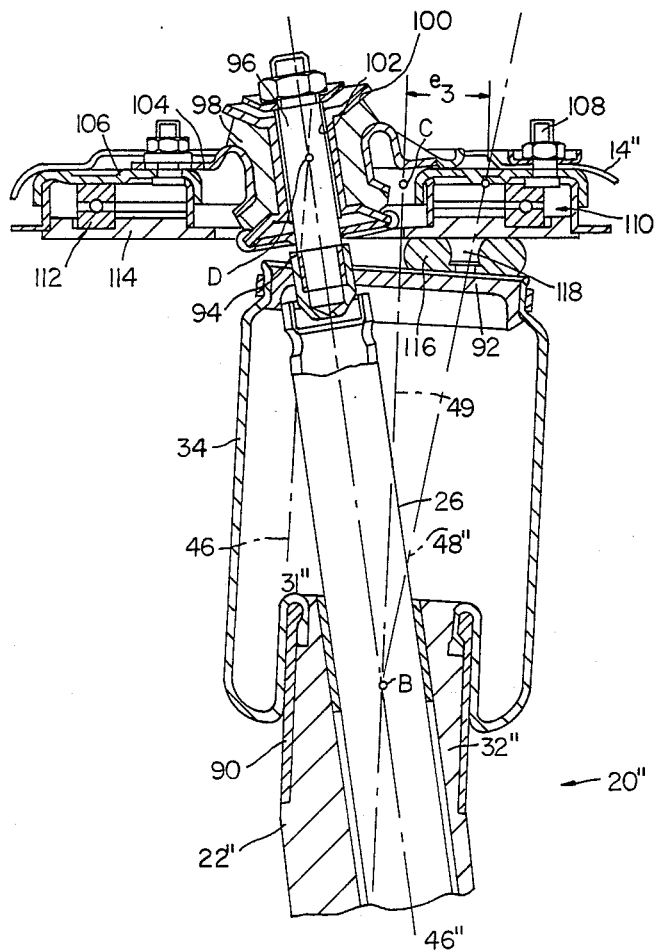
FIG. 4 depicts a third embodiment of the invention as incorporated in a suspension system for steerable wheels of an automotive vehicle and comprising an inclined rolling bellows eccentrically mounted on the frame of the vehicle.

FIG. 4 depicts a further suspension system for steerable wheels of an automotive vehicle (not shown). Elements similar to those shown in FIG. 1 are identified by similar reference numerals, double primed. The wheel, hub, control arm, and most of the shock absorber have been omitted for clarity.

The upper portion 32" of the cylinder 22" of the shock absorber 20" is seen to be deflected or diverted in the direction of the resultant 48". A sleeve 90 serving as the rolling surface for the rolling bellows 34" may be fitted onto the portion 32" adjacent the guide bushing 31" of the piston rod 26" and advantageously serves to clamp the rolling bellows 34" to the cylinder 22" in lieu of clamp 40 shown in the embodiment of FIG. 1. As shown, the guide bushing 31" is seated at an angle within the portion 32" and is generally coaxial with the piston rod 26" and, of course, the cylinder 22".

The upper seat of the rolling bellows 34" may be in the form of a plate-like member 92 which is shown to be mounted on a necked-down portion 94 of the piston rod 26" in an air-tight manner as, for instance, by welding. The plate-like member 92 is mounted on the piston rod 26" in an inclined and eccentric disposition in such a manner that the longitudinal or center axis 49 of the rolling bellows 34" approaches the reultant 48" as closely as possible.

A bolt 96 is threadedly received in a coaxial bore within the necked-down portion 94 of the piston rod 26" and is rotatably seated or journalled within an elastic bearing block 98 made, for instance, of rubber or the like. There is provided within the block 98 a sleeve 100, and a slide bushing 102, made e.g. of plastic, is seated between the bolt 96 and the sleeve 100. In this manner, transverse forces only are transmitted, axial forces are not.

The elastic block 98 is rigidly mounted in an annular flange 104. The flange 104 is bolted to a seat 106. The seat 106, in turn, is affixed to the frame 14" of the vehicle (not shown) by means of bolts 108 or the like. A rotary bearing 110 is supported by the seat 106, one ring or race 112 of the bearing 110 being fixedly connected to a turn table 114.

For supporting or absorbing axial forces, there is provided between the turn-table 114 and the plate-like member 92 an elastic pad 116, the pad 116 being eccentrically displaced relative to the center axis 49 of the rolling bellows 34" by a distance $e_3$. The pad 116 is seen to be of annular or toroidal configuration and is snap-fitted onto a stud 118 extending from the turn-table 114. The pad 116 is positioned substantially within the radius or circle of rotation of the rotary bearing 110.

During steering motion of the wheel (not shown) the piston rod 26" and the rolling bellows 34" are rotated together with the pad 116 and the turn-table 114. Spring forces acting against the plate-like member 92 are transmitted to the frame 14" solely by way of the pad 116; shock absorbing fporces as well as steering forces are absorbed by the block 98.

For structural reasons it may not always be possible to arrange the center axis 49 of the rolling bellows 34" in such a way that it coincides with or at least approaches, the resultant 48". Where the two lines 49 and 48" do not coincide it becomes necessary to transmit or divert spring forces into the frame 14" by eccentrically displacing the pad 116 by distance $e_3$. This eccentric displacement causes a torque to be introduced into the plate-like member 92 and, hence, into the piston rod 26", which affects frictional forces acting on the guide bearing 31" of the piston rod 26" as well as on the piston (not shown) to contribute to minimizing or at least reducing these forces.

Figure 5:
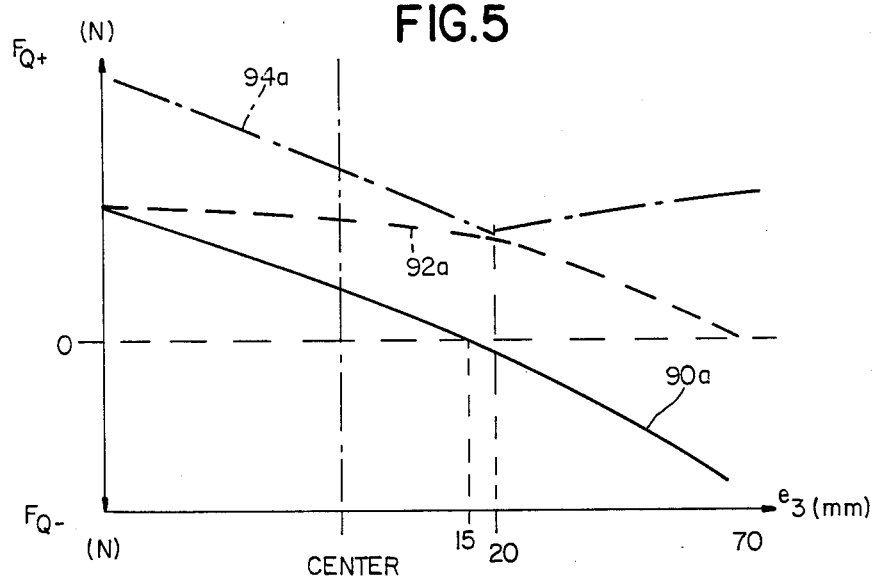
FIG. 5 is a diagram of frictional forces measured in a wheel suspension of the kind shown in FIG. 4.

This effect has been depicted in the diagram of FIG. 5 the abscissa of which represents transverse forces $F_Q$ in Newtons and the ordinate of which represents the eccentricity $e_3$ in millimeters. Curve 90a represents transverse force acting on the piston (not shown) of the shock absorber 20". In particular, curve 90a shows that at an eccentricity of about 15 mm the force approaches 0 (zero) i.e. $F_Q = F_S$; and at greater eccentricity assumes a negative value; that is to say the compensating force $F_S$ would be in eccess of $F_Q$. Curve 92a represents transverse forces $F_Q$ acting upon the guide bushing 31" of the shock absorber 20", and shows this force to approach 0 (zero) only at an eccentricity of about 70 mm. Therefore, an eccentricity $e_3$ of approximately 20 mm is advantageous in that it yields the lowest possible sum of absolute values of the transverse forces $F_Q$ affecting the piston (not shown) and the guide bushing 31" of the piston rod 26". It will, however, be appreciated by those skilled in the art that the values set forth above are exemplary only and that real values depend upon actual structures and upon the extent to which the center axis 49 of the rolling bellows 34" may be inclined relative to the resultant 48".

While the invention has been described with reference to the details of particular embodiments, many changes and variations will occur to those skilled in the art to be possible without departing from the scope of the invention.

What is claimed is:

1. A wheel suspension apparatus, comprising:
   support means;
   hub means for supporting a wheel for rotation in a predetermined plane;
   means for laterally connecting said hub means to said support means for substantially vertical movement relative to said support means in response to force exerted by a load affecting said support means in a predetermined direction;
   axially deformable suspension strut means including a fluid cylinder connected at one of its ends to said hub means and provided at its other end with bearing means, and a piston rod in coaxially telescoping alignment with said cylinder and connected to said support means and slideably retained by said bearing means, said force comprising a first component extending substantially parallel to said plane and a second component extending substantially normal to said plane and intersecting said bearing means, said first and second components generating a resultant extending along a line from a location laterally offset from the connection of said piston rod with said support means and intersecting said plane and said bearing means;
   elongate spring means having a predetermined line of action;

means for connecting a first end section of said spring means to said cylinder adjacent said bearing means; and means for connecting a second end section of said spring means to said support means at a location laterally offset from the connection of said piston rod, whereby said line of action of said spring means extend substantially in the direction of said resultant.

2. The apparatus of claim 1, wherein said piston rod is connected to said support means by elastic means.

3. The apparatus of claim 2, wherein said elongate spring means comprises pneumatic spring means.

4. The apparatus of claim 3, wherein said pneumatic spring means comprises substantially tubular rolling bellows means one end of which is rigidly connected to said support means and an opposite end of which is connected to said cylinder on a surface thereof adjacent said bearing means for rolling movement therealong.

5. The apparatus of claim 4, wherei said surface of said cylinder is of substantially conical configuration.

6. The apparatus of claim 4, wherein said one end of said rolling bellows means is connected to said support means eccentrically relative to the connection of said piston rod.

7. The apparatus of claim 6, wherein said rolling bellows means is connected to flange means integral with said piston rod and positioned eccentrically and inclined relative thereto, and wherein said flange means is supported on said support means adjacent said laterally offset location of said resultant.

8. The apparatus of claim 7, wherein said flange means is additionally supported adjacent said third location by means eccentrically placed relative to the connection of said rolling bellows means thereby to render the absolute value of said frictional forces between said piston rod and said bearing means and said piston and said cylinder as low as possible.

9. The apparatus of claim 7, wherein said flange means is supported adjacent said laterally offset location of said resultant by elastic pad means positioned between said flange means and said support means.

10. The apparatus of claim 9, wherein said support means comprises a rotatably mounted turntable and wherein said piston rod is rotatably mounted in said turntable.

11. The apparatus of claim 10, wherein said piston rod means is mounted in said turntable within an elastic bearing and wherein said elastic bearing is additionally provided with a slidable bearing for receiving said piston rod.

12. The apparatus of claim 6, wherein said rolling bellows means is of substantially circular cross section.

13. The apparatus of claim 12, further comprising substantially arcuate apron means mounted on said support means for engaging a peripheral portion of said rolling bellows means on a side thereof opposite said hub means.

14. The apparatus of claim 13, wherein said apron means comprises an integral part of said support means.

15. The apparatus of claim 13, wherein said apron means engages said bellows means adjacent said bearing means of said cylinder.

16. The apparatus of claim 15, wherein said apron means extends along the periphery of said rolling bellows means in an arc of from about 90° to about 180°.

17. The apparatus of claim 8, wherein said apron means adjacent said support means comprises a tubular section for embracing the entire periphery of said rolling bellows means at a level above said bearing means.

18. The apparatus of claim 17, wherein said bearing means is eccentrically mounted in said cylinder, the eccentricity of said bearing means being in a direction opposite the eccentricity of the connection of the rolling bellows means on said support means.

19. The apparatus of claim 17, wherein said apron means comprises a contour providing a variable curvature for impeding radial expansion of said rolling bellows means at different rates in response to said vertical movement of said hub.

20. The apparatus of claim 18, wherein said piston rod is affixed to a piston slideably mounted in said cylinder and wherein said second component generates frictional forces between said piston and said cylinder and wherein said eccentricities of said bearing means and of the mounting of said rolling bellows means effects a substantial reduction in said frictional forces.

21. The apparatus of claim 20, wherein said support means comprises rotary bearing means and wherein said rolling bellows means is connected to said rotary bearing means, said laterally offset location of said resultant being positioned within the diameter of said rotary bearing means.

* * * * *